Figure 1:
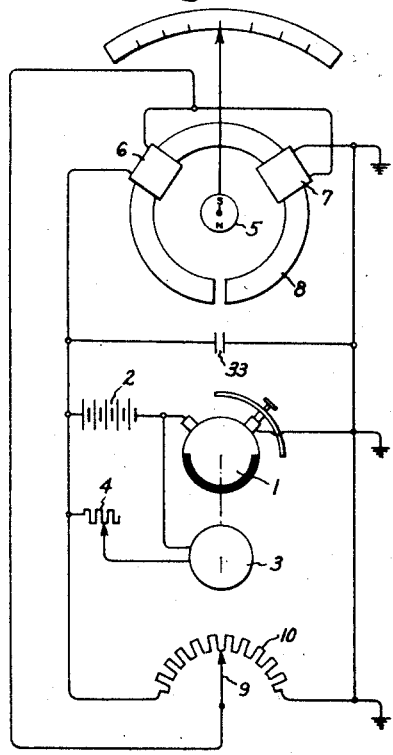

Sept. 9, 1947.    R. G. BALLARD    2,427,180
TELEMETERING SYSTEM
Filed Sept. 21, 1945    2 Sheets-Sheet 1

Inventor:
Robert G. Ballard,
by Prowell & Mack
His Attorney.

Sept. 9, 1947.  R. G. BALLARD  2,427,180
TELEMETERING SYSTEM
Filed Sept. 21, 1945  2 Sheets-Sheet 2

Inventor:
Robert G. Ballard
by Prowell S. Mack
His Attorney.

Patented Sept. 9, 1947

2,427,180

UNITED STATES PATENT OFFICE 2,427,180

TELEMETERING SYSTEM

Robert G. Ballard, Saugus, Mass., assignor to General Electric Company, a corporation of New York Application September 21, 1945, Serial No. 617,865

6 Claims. (Cl. 177—351)

My invention relates to a method of and apparatus for increasing the positioning torque relative to the average energizing current in direct current ratio type instruments. The invention enables the apparatus used to be substantially reduced in cost for a given positioning torque, or to substantially reduce the current heating of the apparatus for a given positioning torque, or to greatly increase the positioning torque for a given average energizing current and heating, or to obtain a combination of such results. Moreover, my invention generally enables the positioning torque to be applied in a more precise and effective manner than heretofore. The invention is very simple but produces results of considerable importance.

In a ratio type of instrument the resistance to the movement of the armature from one position to another position a few degrees away in response to a change in the ratio of the currents in its ratio windings is primarily friction. If the steady torque produced by steady direct current in the ratio windings is not sufficient to overcome this friction resistance, the armature will not turn even though the current be applied for an indefinite length of time $t$; yet the flow of the current uses up energy and causes heating in the circuits through which it flows. On the other hand, if an X per cent increase in the energizing current will produce the required positioning torque, it is evident that the desired result will be accomplished even if such increased current be applied only momentarily for a fraction of time $t$, and with the use of no more energy and heating, or possibly, with a decreased amount of energy and heating. If, using steady current values, the current be increased to the value necessary to reposition the armature, the chances are that once static friction is overcome and the armature begins to move, it will move too far whereas if the increased current be applied in the form of a momentary pulse sufficient to overcome static friction and then removed, more accurate and more prompt positioning results will be obtained. The above examples represent in a general way the difference between my invention and the prior art in that I employ current pulses instead of steady direct current.

Another analogy may be drawn by assuming that it is desired to slide a weighted block exactly ⅛ inch across the top of a table. If the weight be positioned by pushing with a gradually increasing force with the hand until the block moves, there is the probability that the block will be moved too far and have to be moved back and that the integrated amount of energy and the time consumed in correctly positioning the block will ordinarily be much greater than if the weight be moved by a few judicious taps of a hammer.

According to my invention direct current ratio instruments instead of being supplied by continuous direct currents varying in ratio with the quantity measured are supplied with simultaneous pulsating direct currents varying in ratio with the quantity measured, the relative magnitude and rate of the current pulses in relation to the direct current rating of the instrument varying with circumstances but generally to substantially increase the positioning torque as compared to that which would be produced by steady direct currents with the same or a decreased heating of the circuits in which the current flows.

Figure 2:
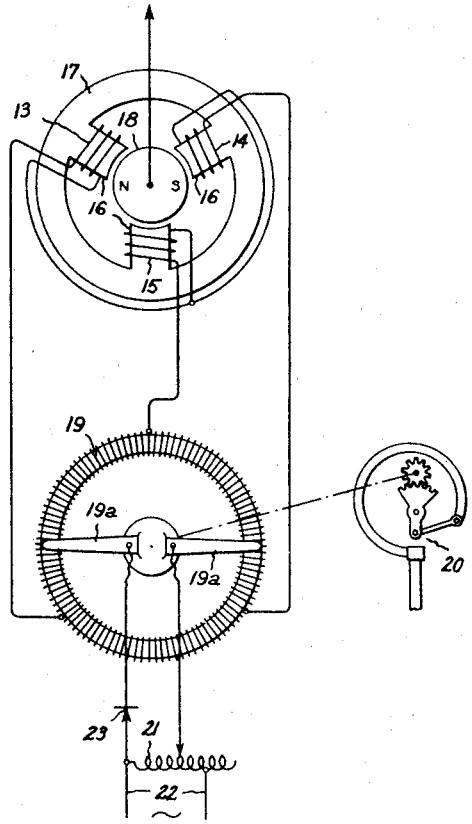
Figure 3:
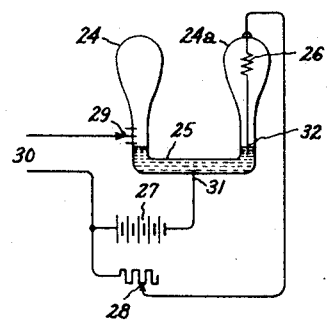
Figure 3A:
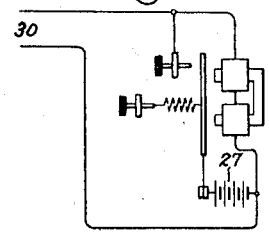
Figure 4:
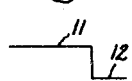
Figure 5:
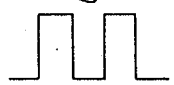
Figure 6:
Figure 7:
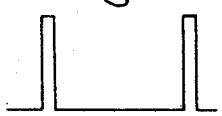
Figure 8:
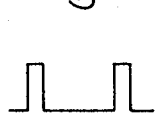
Figure 9:
Figure 10:
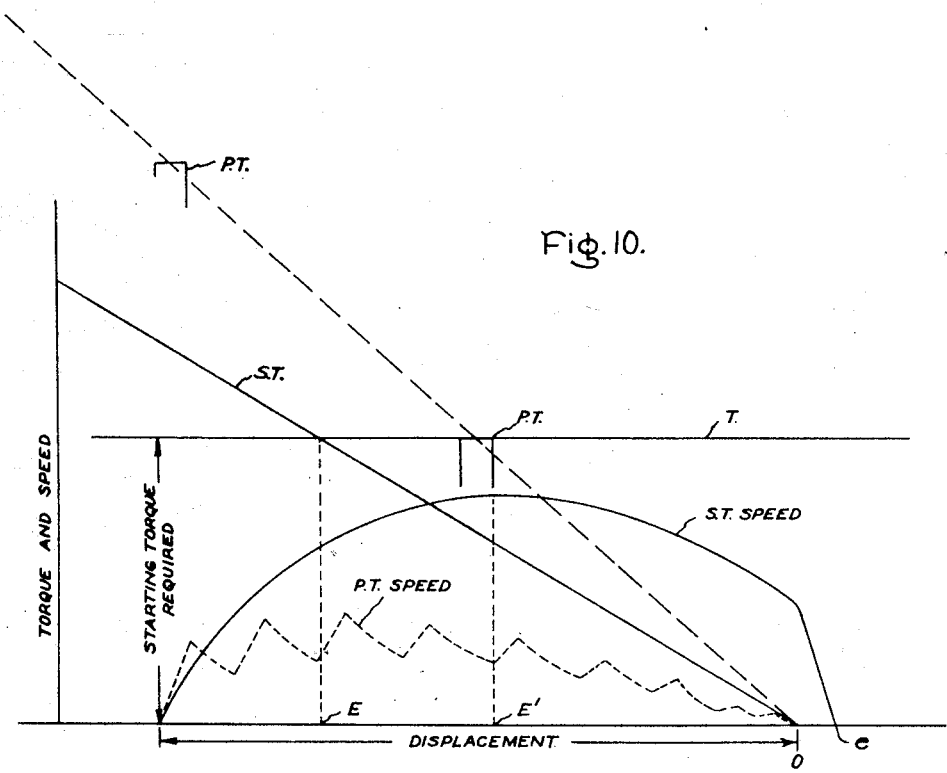

The features of my invention which are believed to be novel and patentable will be pointed out in the claims appended hereto. For a better understanding of my invention, reference is made in the following description to the accompanying drawing in which Fig. 1 represents my invention as applied to a telemetering system using a current interrupter, Fig. 2 shows the invention applied to a telemetering system employing a different form of ratio receiving instrument as compared to Fig. 1, and the system being energized from a transfromer through a one-way rectifier. Figs. 3 and 3a represent different types of current interrupters that may be used in a direct current supply source. Fig. 4 represents by means of a curve a value of steady direct current for comparison with Figs. 5, 6, 7 and 8. Fig. 5 represents a pulsating direct current of the same average value as that shown in Fig. 4 productive of twice the heating and twice the torque when used in a ratio instrument. Fig. 6 represents a pulsating direct current productive of twice the torque and equal heating as compared to the curve of Fig. 4. Fig. 7 represents pulsating direct current productive of three times the torque and equal heating as compared to the curve of Fig. 4. Fig. 8 represents direct current pulsations productive of one-half the heating and one and one-half times the instantaneous positioning torque as compared to Fig. 4. Fig. 9 represents the nature of the direct current pulsations using half-wave rectification as in Fig. 2. Fig. 10 represents displacement torque and speed curves for comparing armature positioning actions using steady and pulsating direct currents.

Referring now to Fig. 1, I have here shown a direct current telemetering system of the character described in Letters Patent of the United States No. 2,274,415, February 24, 1942, to Jewell, except that an interrupter 1 is provided in the direct current source of supply 2 used therewith. The interrupter is shown as being driven by a motor 3 the speed of which may be varied by a variable resistance 4 through which the motor is supplied from source 2. The interrupter is shown as a cylinder with a surface of half insulating material and half conducting material with two brushes, at least one of which may be adjustable toward and away from the other.

As explained in the Jewell patent above referred to, the polarized rotor 5 of the receiver takes up a position dependent upon the ratio of the current in the two coils 6 and 7 wound on the split magnetic core 8. These coils are connected to be energized in series to produce opposing fluxes about the core 8, and the ratio of their currents is dependent upon the position of the movable brush 9 of a transmitter resistor 10. The coil circuit and the transmitter are connected in parallel with the source of supply 2 with its interrupter 1 in series. The receiver generally has no control spring. Its rotor tends to line up with the resultant flux produced across the diameter of core 8 by the coils 6 and 7, and the positioning torque is proportional to the value of such resultant flux which, in turn, in proportional to the current in the coils. In a ratio instrument the correct position of the armature is determined by the ratio of the currents in the ratio windings. However, the torque to move the armature to correct position is proportional to the current magnitude and not ratio. Thus, in a ratio instrument like that shown in Fig. 1, the pointer position shown is for equal currents in the windings 6 and 7. These currents might for example be .2 ampere for normal continuous current rating of the instrument, which means that for extreme pointer positions to the right or left of the scale the current in one winding would be zero or nearly zero and for the other winding, say, .5 ampere. Hence the continuous current rating is in general determined by the heating caused by the allowable continuous current in any winding under its maximum current condition. With my invention the maximum currents can be increased so that for the equal ratio current position of Fig. 1 we might have .4 ampere per coil. Thus if the pointer were displaced from current position, the torque tending to return it to correct position would be doubled as compared to the torque for .2 ampere continuous current and the maximum coil current for the extreme position might be, say, 1 ampere instead of .5. This 1 ampere, if allowed to flow continuously, would soon damage the instrument by overheating, but if it is on for $1/60$ second and off $4/60$ second, the positioning torque is still double and the average heating of the coil is no greater than before.

Assume for the moment that the interrupter 1 is not used but that the ratio instrument of Fig. 1 is energized by continuous or nonpulsating currents as in the previously mentioned Jewell patent, and that the current in a given coil has an arbitrary value represented by line 11 above the zero current line 12, Fig. 4. Line 11 may also represent the value of the positioning torque of this instrument for a given angular displacement from correct position. For instance, if the rotor be turned from correct position by a given small angle, the torque tending to return it to correct position may be represented by the value indicated by line 11. If the currents in the instrument coils are increased, the torque increases and if decreased, the positioning torque decreases for that particular displacement angle. Now assume that I employ a source of supply at 2 which is double the voltage of that previously assumed and connect the interrupter 1 in the supply circuit, as shown, and operate the interrupter by the motor 3 so as to provide current pulses instead of steady current to the windings. If the interrupter is closed for one-half the time and open for one-half the time, the current pulses in the same coil will appear as in Fig. 5. The current 13 is of double the magnitude as compared to current 11 of Fig. 4 but only flows for one-half the time. Hence the average current is the same but the maximum positioning flux and torque have been doubled for the particular displacement assumed. Since the heating is proportional to the square of the current but is only present for one-half the time, the heating of the coils, with the pulses of Fig. 5, will be double that for the current value 11, Fig. 4. To obtain double the torque for about the same average heating as for Fig. 4, I may use an interrupter which cuts the current off for three-fourths of the time to obtain pulses of the character shown in Fig. 6.

As represented in Fig. 1, the interrupter as adjusted will cut the current off somewhat longer than it is on, and the "current on" time may be increased or decreased by shifting the brushes toward or away from each other on the commutator. Thus with pulses such as shown in Fig. 6 the instantaneous maximum positioning torque is doubled, the heating is the same, and the average current is one-half that as compared to the situation with steady direct current as pictured in Fig. 4. The difference between Figs. 5 and 6 may be brought about by the use of shorter length "on" periods for the impulse choppers operating at the same speed.

Fig. 7 represents current pulses for tripling the instantaneous positioning torque as compared to Fig. 4 with the same heating. In Fig. 7 the maximum current has been tripled in value and the ratio of time on to time off of the current is 1 to 9. Fig. 7 indicates the use of the same time adjustment of the "current on" period of the chopper 1 but with the chopper operated at a lower speed as compared to Fig. 6.

Fig. 8 represents current pulses which will produce 50 per cent more instanteous positioning torque and one-half the heating of the continuous direct current of Fig. 4 and corresponds to a 50 per cent higher maximum instantaneous current and torque with a "time on"-"time off" ratio of 2/9. A source of supply of this character will make operative many a system which has become inoperative for continuous service on continuous direct current corresponding to a value represented in Fig. 4, due to overheating or lack of sufficient operating torque, or both.

Fig. 9 represents the nature of the current pulsations when using an alternating current source of supply with half-wave rectification as in Fig. 2. Here the heating is comparable to that resulting from the current pulses depicted in Fig. 5 but with slightly greater instantaneous positioning torque, due to the peaked shape of the pulses in Fig. 9.

Fig. 2 represents another form of direct current ratio instrument to which my invention is applicable. The receiver has three coils 13, 14, and 15 wound on three radial magnetic pole pieces 16 connected by the magnetic yoke 17. The armature 18 is polarized as indicated. One end of each coil is connected to a common point, and the other ends of the coils extend to three equally distant points of a circular closed resistor 19 forming a portion of a transmitter. A pulsating direct current power supply is fed to diametrically opposite points of the resistor through brushes 19a, which brushes are rotated about the resistance in accordance with the measurement or other motion to be indicated at the ratio instrument receiver. I have shown the brushes as being adjustable by a pressure responsive device at 20. The power supply consists of an adjustable autotransformer 21 fed from an alternating current power source 22 with a one-way rectifier 23 between the transformer and brushes 19a. The three coils 13, 14 and 15 of the receiver are wound to produce like poles opposite the armature for the same direction of current flow therein. However, it is evident that current flowing into one coil from the transmitter must flow out one or both of the other coils, so that poles of unlike polarity will be created opposite the armature. For the transmitter brush position illustrated, it is evident that the current will flow into coil 13 and out through coil 14 with no current in coil 15. Hence, the armature will line up with its magnetic axis as near as possible between the two energized stator poles. Movement of bruhses 19a clockwise will cause rotation of the armature counterclockwise and vice versa. The same direction of rotation in transmitter and receiver may be had by reversing two of the coil leads. It is evident that the maximum instantaneous positioning torque will depend upon the maximum instantaneous current, and that the principles heretofore explained apply, and that beneficial results are obtainable with the use of current pulsations over that possible with continuous or steady direct current. In general, the invention is applicable to any direct current ratio instrument.

In Fig. 3, I have represented a thermal type of interrupter which may be used between the direct current source of supply and the ratio instrument supplied with current pulsations. The device of Fig. 3 comprises a pair of gaseous bulbs 24 and 24a connected by a downward extending U tube 25 with some mercury partially filling the U tube and providing a gaseous seal between the bulbs. A heater filament 26 is contained in bulb 24a and is connected to the source of supply 27 through an adjustable resistance 28 and contacts in the mercury. The source of supply 27 is also connected to supply the ratio instrument system 30, such as the system of Fig. 1, through one of several contacts at 29 in the riser of the tube to bulb 24. The lead to these contacts 29 may be connected to any one of the three contacts shown, which are positioned at different elevations in the riser and normally above the level of the mercury when heater filament 26 is not energized. The lower contact 31 which is always covered by mercury in common to both circuits. The contact at 32 leading to heater filament 26 is positioned to extend into the mercury when the filament is not energized. This device operates as follows: Filament 26 is energized and heats the gas in its bulb 24a which expands and forces mercury down in its riser and up in the riser of bulb 24. This opens the heater circuit at contact 32 and closes the circuit 30 at one of the contacts at 29. Bulb 24a cools quickly and the mercury returns to the original position, opening the circuit 30 and closing the circuit of heater 26. This operation repeats itself rapidly and the device serves the purpose of the current chopper 1 of Fig. 1. The rate of operation can be varied by varying the resistance at 28, and the relative "on-off" period of circuit 30 may be varied by the adjustable connection at contacts 29. Such adjustments may be supplemented by tipping the device to change the normal level of the mercury in the two risers.

An adjustable vibrating relay such as shown in Fig. 3a may also be used as a current chopper. The shape of the pulses produced by the different forms of current interrupters may be varied by circuit constants. For instance, if I place a small condenser 33 across the battery and current chopper in Fig. 1, the pulses to coils 6 and 7 can be made to depart from a strictly square wave.

To further illustrate the benefit of my invention, refer to Fig. 10. Assume that we have a ratio instrument the armature of which is out of correct position by some small displacement angle designated "displacement" in Fig. 10, with the point 0 the correct position of the armature. Assume further that the static friction of the armature and the torque necessary to start it moving toward the zero point is represented by the height of the line marked T. Assume further that the instrument is first energized by continuous direct current of the value represented in Fig. 4, and sufficient to overcome the static friction of the armature for the displacement indicated. The resulting instrument torque decreases for smaller angles of displacement and is always present except at zero displacement and reverses in direction if the armature moves beyond the zero displacement point, so that we can represent it by the line marked S. T., for steady torque. Applying such torque to the armature, it moves toward the zero point, first accelerating when the S. T. torque is high and decelerating as the 0 displacement point is approached, when the S. T. torque is low, such that the speed of the armature movement may be represented by the curve "S. T. speed." After the armature is started, the friction to its movement is much less than the static friction T, and due to its inertia, it overshoots the 0 displacement position, is acted upon by the low reverse S. T. and comes to rest at point e. The steady torque is now too low to overcome static friction T which is independent of displacement and hence there is an error in positioning the armature by the amount 0e. It is to be further noted that for any displacement less than the amount 0E where the S. T. equals the static torque required to start the armature from rest, the displacement would not be corrected so that there is possibility of positioning error up to the amount 0E.

Now assume that we energize the same instrument with the same displacement with current pulsations represented in Fig. 8 which produce 50 per cent more torque and one-half the heating as compared to the steady current value assumed. The torque pulsations may be represented by the upper ends of the torque pulses P. T. which also decrease in positioning value as the angle of displacement decreases. The two P. T. pulses indicated do not represent the number or spacing of such torque pulses to return the armature to 0 displacement angle but merely their relative values at different displacement angles. Applying such torque pulsations, the armature will move to the 0 displacement position by a series of accelerations and decelerations and have an irregular speed somewhat as indicated by the dotted line curve P. T. speed. It is to be noted that the propelling action on the armature is such as to position it correctly without overshooting. Also, it is to be noted that such torque pulsations will overcome static friction and start the armature toward 0 displacement position for any displacement not exceeding the amount OE' so that the possible positioning error of the instrument is only two-thirds that with steady direct current energy of twice the heating value. The number of torque pulses in the curve "P. T. speed" represented in Fig. 10 presumably is not correct, as this will depend upon a variety of factors such as the inertia of the armature, friction at different speeds, the actual speed obtained and the rate of the pulses. As the speed increases for a given pulse rate, the pulses will appear farther apart in the "P. T. speed" curve, thus tending to keep the speed low with correspondingly negligible overshoot.

Another factor which is distinctly favorable to use of a pulsating as distinguished from a steady torque, but not represented in Fig. 10, is that the gentle vibration incident to the use of a pulsating torque tends to reduce the static friction which it is necessary to overcome in starting the armature from a rest condition. This is evident from the common practice of gently tapping an indicating instrument for the purpose of obtaining a more accurate reading.

The frequency of the pulsating current used may vary considerably. I have used a frequency of 10 pulses per second with very satisfactory results, but no reason appears why any frequency up to several hundred per second could not be used with the advantages claimed. It is recommended that before selecting the frequency to be used with a particular size, style, and use of ratio instrument, a sample instrument be tested using a variable frequency current chopper to determine over what frequency range best results are obtained.

In accordance with the provisions of the Patent Statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. The method of operating a direct current ratio instrument so as to increase its torque to heating ratio over that obtainable with continuous direct current energization, which consists in energizing its ratio windings with simultaneous direct current pulsations having maximum values greater than called for by the continuous direct current rating of the instrument and with an average heating effect no greater than that which would be produced if the instrument were energized by rated continuous direct current.

2. The method of operating a direct current ratio instrument so as to increase its torque to heating ratio as compared to such ratio when energized with continuous direct current, which consists in energizing its windings with simultaneous direct current pulsations having maximum values greater than called for by the continuous direct current rating of the instrument, said pulsations having a "time on" period which is less than the "time off" period such that the average heating is no greater than that which would be produced if the instrument were energized by rated continuous direct current.

3. The method of increasing the torque to heating ratio of a direct current ratio indicating instrument over that obtainable with continuous direct current energization, which consists in energizing the ratio windings with simultaneous direct current pulsations having maximum values such as would overheat the instrument if maintained continuously but of such duration and frequency as to have an average heating effect less than that which would cause overheating of the instrument, the frequency of such pulsations being sufficiently high as to produce correct ratio measurement indications under fluctuating current ratio measuring conditions.

4. A measuring system including a direct current ratio instrument having a plurality of ratio current energizing circuits, means responsive to a measurement for determining the ratio between the energizing currents for said circuits, and means for supplying said system with pulsating direct current such that the currents in the instrument energizing circuits pulsate simultaneously, the maximum value of such current pulsations being in excess of the continuous direct current rating of instrument energizing circuits, and the duration of said pulses being less than the period between pulses.

5. A measuring system including a direct current ratio instrument having a plurality of energizing circuits, means responsive to a variable to be indicated by said instrument for determining the relative magnitude of the currents in said energizing circuits, and means for supplying said circuits with simultaneous current pulsations having a maximum value greater than that corresponding to the continuous direct current rating of said circuits and with a "time on" to "time off" relation such that the average heating in the instrument energizing circuits is no greater than that which would be caused by energization with continuous direct current at the continuous current rating.

6. A measuring system including a direct current ratio instrument having a plurality of ratio current energizing circuits, means responsive to a measurement for determining the ratio between the energizing currents of said circuits, a direct current source of supply for said circuits, and means for intermittently interrupting the currents flowing from said source to said circuits such that the ratio instrument energizing circuits are energized by simultaneous current pulsations, said means being adjustable to vary the "time on" to "time off" relation of said pulses and their frequency.

ROBERT G. BALLARD.

REFERENCES CITED

The following references are of record in the file of this patent:

UNITED STATES PATENTS

| Number | Name | Date |
|---|---|---|
| 2,422,240 | Jackes | June 17, 1947 |

FOREIGN PATENTS

| Number | Country | Date |
|---|---|---|
| 400,289 | Great Britain | 1933 |